Figure 1:
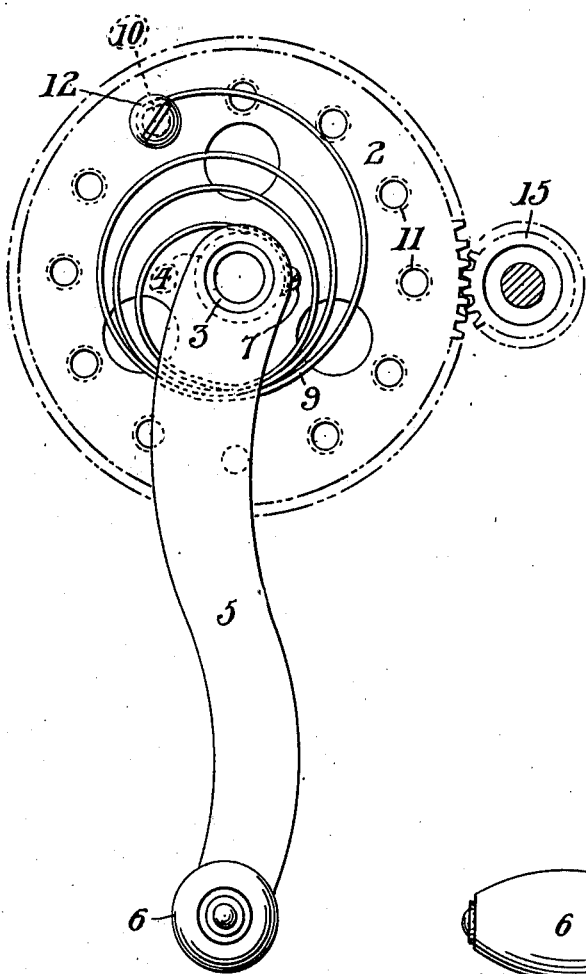

R. H. VOEGTLE.
YIELDABLE GEARING.
APPLICATION FILED SEPT. 23, 1910.

989,312.

Patented Apr. 11, 1911.

WITNESSES

INVENTOR
R. H. Voegtle
By
Atty's

UNITED STATES PATENT OFFICE.

RICHARD H. VOEGTLE, OF SHARPSBURG, PENNSYLVANIA.

YIELDABLE GEARING.

989,312.  Specification of Letters Patent.  Patented Apr. 11, 1911.

Application filed September 23, 1910. Serial No. 583,377.

*To all whom it may concern:*

Be it known that I, RICHARD H. VOEGTLE, a citizen of the United States of America, residing at Sharpsburg, in the county of Allegheny and State of Pennsylvania, have invented certain new and useful Improvements in Yieldable Gearing, of which the following is a specification, reference being had therein to the accompanying drawing.

This invention relates to yieldable gearing particularly adapted for use in connection with moving picture machines and the primary object of the invention is to provide the crank or handle of a moving picture machine with simple and effective means for regulating and insuring an even movement of the operating gear wheel of the machine.

Another object of the invention is to provide a yieldable gearing in a manner as will be hereinafter set forth for equalizing the speed of a moving picture machine and thereby obtaining a uniform movement of the film before the aperture of the machine.

Figure 2:
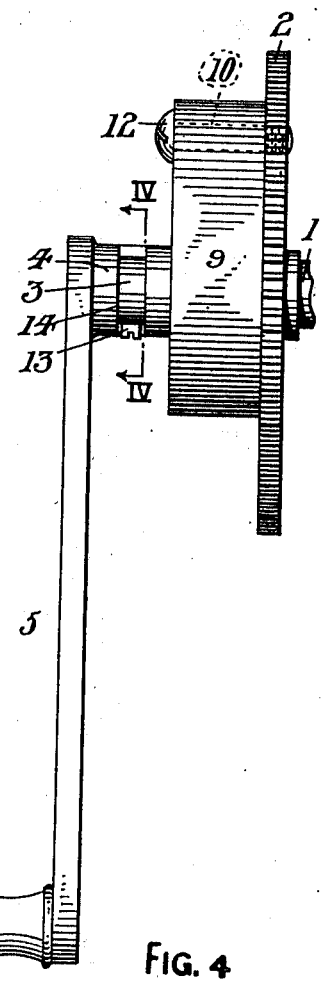
Figure 3:
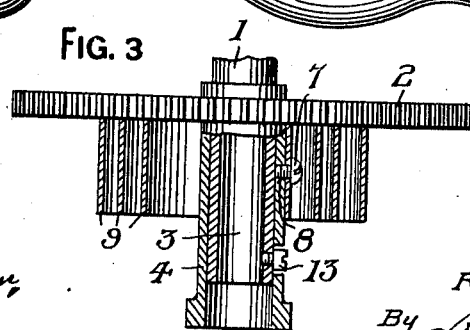
Figure 4:
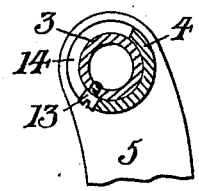

I attain the above objects by a mechanical construction that will be hereinafter specifically described and then claimed, and reference will now be had to the drawing forming a part of this specification, wherein:

Figure 1 is a side elevation of the yieldable gearing. Fig. 2 is a front elevation of the same. Fig. 3 is a horizontal sectional view of a portion of the gearing, and Fig. 4 is a cross sectional view, taken on the line IV—IV of Fig. 2.

In the drawings, the reference numeral 1 denotes a supporting shaft of a moving picture machine and 2 is a large gear wheel provided with a tubular spindle 3 connected to said shaft 1. Loosely mounted upon the tubular spindle 3 is the tubular pin 4 of a crank 5, said crank having a handle 6. Connected to the tubular pin 4 by a screw or other fastening means 7 is the inner convolution 8 of a spirally wound retractile band spring 9, said spring having the outer convolution thereof connected to a pin or post 10, carried by the gear wheel 2 adjacent to the periphery thereof, said pin or post being detachably mounted in one of a plurality of circumferentially disposed openings 11 equally spaced adjacent to the periphery of the gear wheel 2. It is preferable to thread the end of the pin or post 10 and provide the outer end thereof with a screw head 12, whereby the pin or post can be easily shifted from one opening to another. The tubular pin 4 is limited in its movement upon the spindle 3 by the head of a screw 13 extending into a segment-shaped slot 14 provided therefor in the tubular pin 4. The gear wheel 2 is adapted to mesh with a small gear wheel 15 forming part of the operating mechanism of a moving picture machine.

When the moving picture machine is operated by the crank 5, the spring 9 is under tension, and should the operator fail to maintain an even movement of the crank 5, the spring compensates for the uneven movement and thereby insures a uniform movement of the large gear wheel 2.

What I claim, is:

A yieldable gearing comprising a supporting shaft, a large gear wheel provided with a plurality of circumferentially disposed openings adjacent to the periphery of said wheel, a spindle carried by said gear wheel and connected to said supporting shaft, a tubular pin loosely mounted upon said spindle, a crank carried by said tubular pin, a spirally wound retractile band spring having one end thereof attached to said tubular pin, a post detachably mounted in one of the openings of said gear wheel and adapted to have the opposite end of the spring attached thereto, and means carried by said spindle and normally engaging said tubular pin for limiting the movement of said tubular pin upon said spindle, substantially as described.

In testimony whereof I affix my signature in the presence of two witnesses.

RICHARD H. VOEGTLE.

Witnesses:
 KARL H. BUTLER,
 MAX H. SROLOVITZ.

Copies of this patent may be obtained for five cents each, by addressing the "Commissioner of Patents, Washington, D. C."